United States Patent
Corghi

(10) Patent No.: US 11,999,205 B2
(45) Date of Patent: Jun. 4, 2024

(54) TYRE CHANGING APPARATUS FOR DEMOUNTING AND MOUNTING A TYRE OF A VEHICLE WHEEL

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 702 days.

(21) Appl. No.: 16/901,420

(22) Filed: Jun. 15, 2020

(65) Prior Publication Data

US 2020/0398619 A1 Dec. 24, 2020

(30) Foreign Application Priority Data

Jun. 18, 2019 (IT) .................. 102019000009321

(51) Int. Cl.
*B60C 25/05* (2006.01)

(52) U.S. Cl.
CPC ........ *B60C 25/056* (2013.01); *B60C 25/0515* (2013.01); *B60C 25/0518* (2013.01); *B60C 25/0545* (2013.01)

(58) Field of Classification Search
CPC .............. B60C 25/056; B60C 25/0515; B60C 25/0518; B60C 25/0545; B60C 25/0593; B60C 25/138
See application file for complete search history.

(56) References Cited

U.S. PATENT DOCUMENTS

| | | | | |
|---|---|---|---|---|
| 5,196,772 A | * | 3/1993 | Kupka | B60C 25/132 318/434 |
| 6,227,277 B1 | * | 5/2001 | Corghi | B60C 25/132 157/1.22 |
| 8,967,223 B2 | | 3/2015 | Braghiroli et al. | |
| 10,000,101 B2 | * | 6/2018 | Corghi | B60C 25/0542 |
| 10,029,521 B2 | * | 7/2018 | Corghi | B60C 25/0512 |
| 10,071,607 B2 | * | 9/2018 | Corghi | B60C 25/14 |
| 10,132,720 B2 | * | 11/2018 | Corghi | G01M 17/013 |
| 10,213,975 B2 | * | 2/2019 | Lindsay | B29D 30/54 |
| 10,620,606 B2 | | 4/2020 | Sotgiu | |

(Continued)

FOREIGN PATENT DOCUMENTS

| | | |
|---|---|---|
| EP | 2353889 | 8/2011 |
| EP | 3415348 | 12/2018 |

*Primary Examiner* — Ramesh B Patel
(74) *Attorney, Agent, or Firm* — Pearne & Gordon LLP; Bryan M. Gallo

(57) ABSTRACT

A tyre changing apparatus (1) for demounting and mounting a tyre relative to a respective rim of a vehicle wheel (2) includes: a frame (10); a chuck (11) rotating about an axis of rotation (A); a working tool (12), connected to the frame (10) and movable towards and away from the chuck; an electric motor (13), imparting to the chuck (11) a rotation speed and a working torque; a controller (14), including a power unit (141) supplying voltage and current as a function of a drive signal (101); a processing unit (142) generating the drive signal (101) and programmed to derive a control parameter (102) representing the working torque delivered to the electric motor (13) and to apply a torque-limiting function responsive to the control parameter (102). The processing unit (142) derives an activation parameter and, as a function of the activation parameter, enables and disables the torque-limiting function.

15 Claims, 6 Drawing Sheets

(56) References Cited

U.S. PATENT DOCUMENTS

| | | | |
|---|---|---|---|
| 11,214,103 B2* | 1/2022 | Sotgiu | B60C 25/0554 |
| 11,254,174 B2* | 2/2022 | Gonzaga | B60C 25/138 |
| 11,654,731 B2* | 5/2023 | Gonzaga | B60C 25/135 |
| | | | 157/1.17 |
| 2011/0181099 A1 | 7/2011 | Braghiroli et al. | |
| 2018/0356784 A1* | 12/2018 | Sotgiu | G05B 19/048 |
| 2019/0248344 A1* | 8/2019 | Corghi | B60C 25/145 |
| 2020/0189333 A1* | 6/2020 | Corghi | G01M 17/022 |
| 2020/0324590 A1* | 10/2020 | Corghi | B60C 25/0527 |
| 2020/0398619 A1* | 12/2020 | Corghi | B60C 25/056 |
| 2021/0101424 A1* | 4/2021 | Corghi | B60C 25/0545 |

* cited by examiner

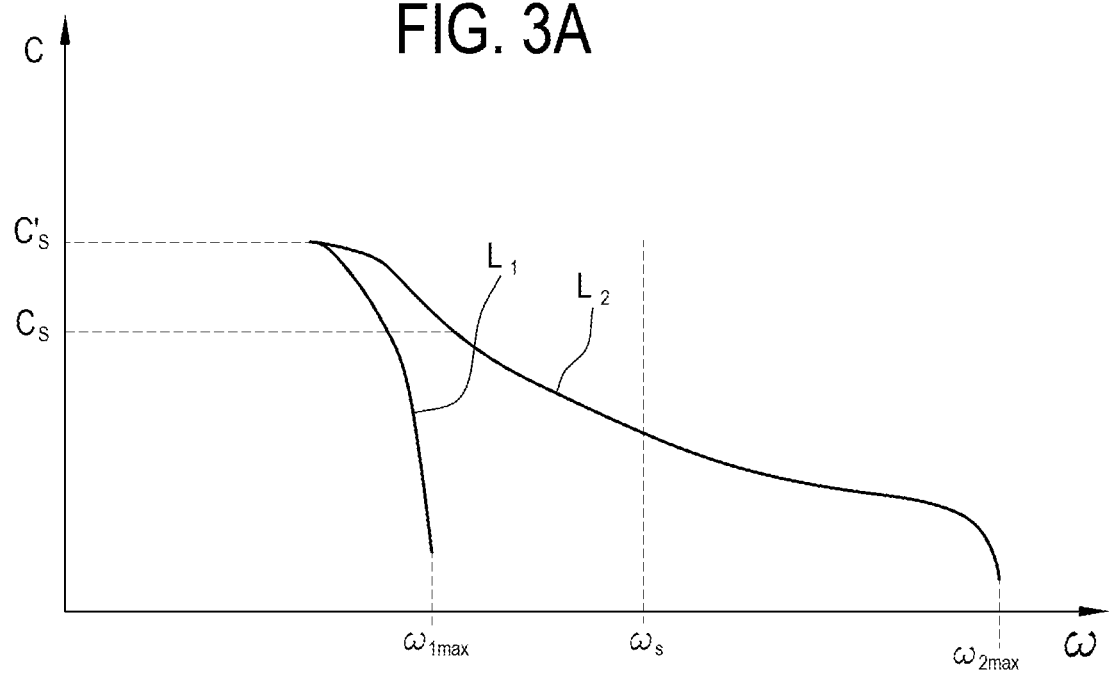
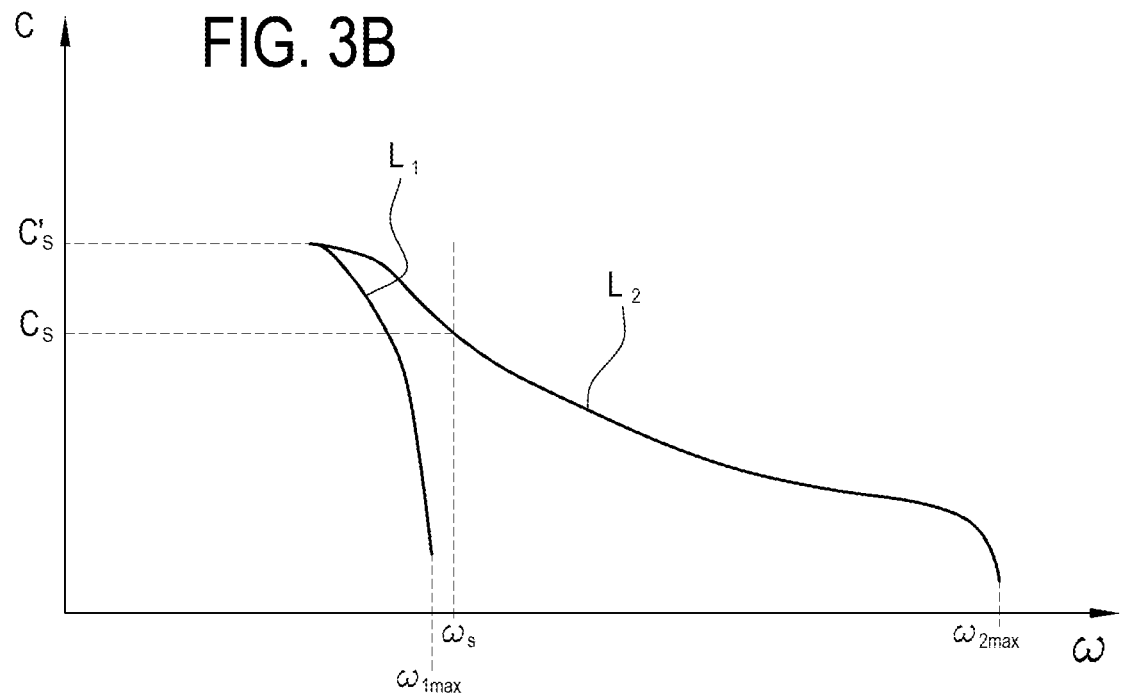

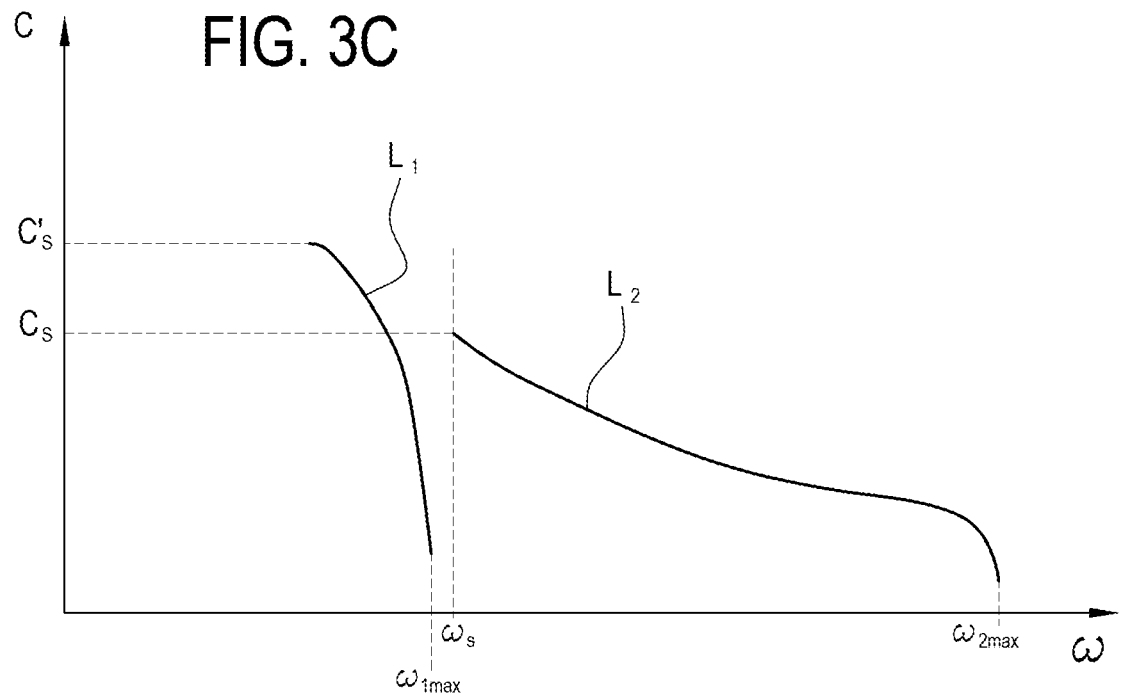
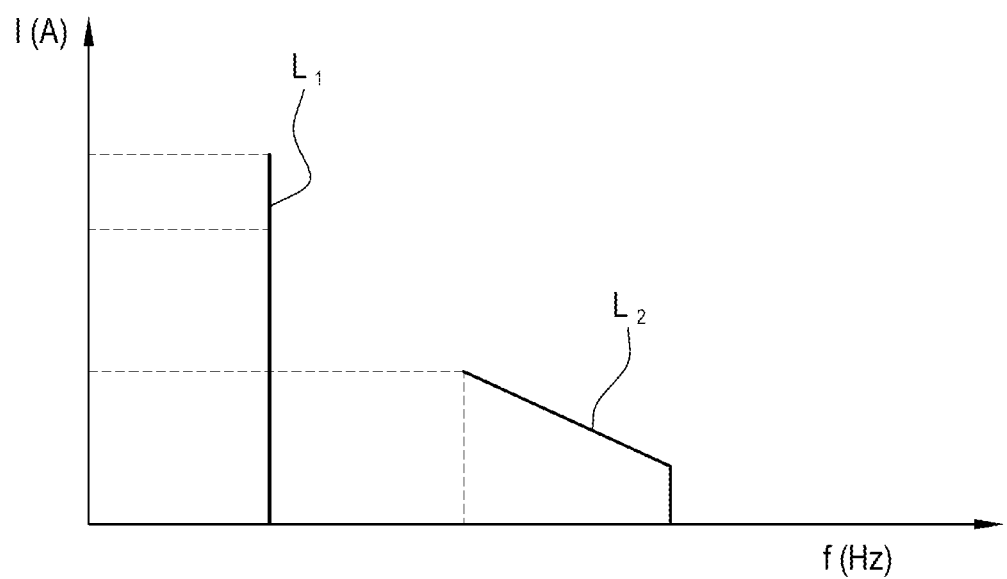

TYRE CHANGING APPARATUS FOR DEMOUNTING AND MOUNTING A TYRE OF A VEHICLE WHEEL

This invention relates to a tyre changing apparatus and to a method for mounting and demounting a wheel tyre to and from a respective wheel rim. During mounting or demounting operations, the wheel is entrained in rotation by a chuck which is driven by an electric motor controlled by a machine controller. The controller sets the power supply parameters of the electric motor (for example, supply current or supply voltage or supply voltage frequency) in order to impart to the chuck a rotation speed at a working torque determined by the external load. The controller sets the power supply parameters as a function of control signals received from a user through a control means, which may be a pedal, a lever or another user interface.

During mounting and demounting operations, the tyres and the parts of the tyre changing apparatus are subjected to considerable stresses which, under some conditions, could lead to damage to the tyre or even to the tools used.

The extent of the stress exerted on the tyre and on machine parts depends on several factors, chiefly the type of wheel and the experience of the operator in using the apparatus.

In some cases, the operator's inexperience or lack of skill could lead to excessive working torque at high rotation speeds resulting in damage to the tyre involved.

In some solutions known in the prior art, to avoid reaching excessively high values of working torque, the controller is programmed to apply a torque-limiting function by setting power supply parameters in such a way as not to exceed a predetermined torque value. Solutions of this kind are described, for example, in documents EP3415348A1 and U.S. Pat. No. 5,196,772A.

In some situations, however, as for example with particularly rigid or heavy tyres, the working torque required may be very close to the maximum torque deliverable by the electric motor. In such cases, therefore, the torque-limiting function prevents working on the tyres even if the user is intentionally applying the required working torque.

In other solutions, in which the machines can be operated at different rotation speeds by acting on separate controls, the maximum deliverable torque is indiscriminate and remains the same whether the machine is operating at a reduced speed or at a high speed.

When assessing the maximum deliverable torque, however, these solutions do not take the rotation speed into account. In some cases, therefore, where the maximum torque is, for example, calibrated for a reduced speed, it might be too high to deliver at higher rotation speeds.

As a result, tyre changing apparatuses of this kind are safer on the one hand but less flexible on the other.

The aim of this disclosure is to provide a tyre changing apparatus and a method for mounting and demounting a tyre to and from a wheel rim such as will be unaffected by the abovementioned disadvantages of the prior art.

This aim is fully achieved, according to this disclosure, by the tyre changing apparatus and method for mounting and demounting a tyre to and from a wheel rim as characterized in the appended claims.

According to one aspect of it, this disclosure provides a tyre changing apparatus for mounting and demounting a tyre relative to a corresponding vehicle wheel rim.

The apparatus comprises a frame. The apparatus comprises a chuck. The chuck is connected to the frame. The chuck is configured to rotate about an axis of rotation. The chuck is connectable to the wheel and entrains it in rotation.

The apparatus comprises a working tool. The tool is connected to the frame (for example, through an operating arm). The tool is movable towards and/or away from the chuck, preferably along a direction parallel to the axis of rotation, to interact with a tyre bead.

The apparatus comprises an electric motor. The electric motor is connected to the chuck to impart a rotation speed and a working torque to it.

In an embodiment, the electric motor is connected directly to the chuck. In other embodiments, there is a gear motor interposed between the electric motor and the chuck.

The apparatus comprises a controller. The controller is configured to receive electrical power input to feed the electric motor.

In an embodiment, the controller comprises a power unit. In an embodiment, the controller comprises a processing unit. The processing unit is configured to generate a drive signal. The power unit is configured to deliver supply voltage and supply current as a function of the drive signal in order to control the electric motor. The power unit is configured to deliver the supply voltage (or the supply current) at a supply frequency as a function of the drive signal.

In an embodiment, the processing unit is programmed to derive a control parameter. In an embodiment, the control parameter represents the working torque delivered to the electric motor. In other embodiments, the control parameter represents the rotation speed of the electric motor.

In an embodiment, the processing unit is configured to apply a torque limiting function. In an embodiment, the torque-limiting function is applied as a function of the control parameter so as to prevent the electric motor from delivering a working torque that is higher than a threshold value. In an embodiment, the processing unit is configured to apply the torque-limiting function by generating a specific drive signal which varies the supply voltage frequency and/or the supply voltage in order to keep the working torque below the threshold value.

In an embodiment, the torque-limiting function might be applied by a mechanical or electronic limiter connected to the processing unit to receive corresponding drive signals which control it in such a way that the working torque remains below the threshold value.

In an embodiment, the processing unit is programmed to derive an activation parameter. In an embodiment, the processing unit is programmed to switch between an activated configuration, in which the torque-limiting function is enabled, and a deactivated configuration in which the torque-limiting function is disabled. In an embodiment, the processing unit is programmed to switch between the activated configuration and the deactivated configuration as a function of the activation parameter.

That way, the apparatus allows the torque-limiting function to be activated in a conditional manner. Thus, in the event of real necessity, when the working torque required for a specific operation is higher than the threshold value, the apparatus allows the user to deliberately disable the torque-limiting function.

In an embodiment, the activation parameter represents the rotation speed of the electric motor.

In one example, the activation parameter is representative of a control device selection among a plurality of control device.

For example, the apparatus includes a first control device and a second control device, each one programmed to activate the apparatus with specific operating condition as for example the rotational speed of the electric motor. The activation parameter depends on which control device is activated. If the first control device is actuated, the processing unit switches to the activated configuration. Instead, if the second control device is actuated, the processing unit switches to the deactivated configuration.

For example, the first control device is a first pedal, configured to control the electric motor until a first rotation speed while the secondo control device is a second pedal, configured to control the electric motor until a second rotation speed, lower than the first rotation speed.

In other embodiments, the first control device and the second control device are buttons, for example displayed on a touch screen.

In one example, the activated configuration is triggered by the processing unit when the control device reaches an activating position, selected among a plurality of possible positions of the control device. For example, the control device has a first position (corresponding to a low speed of rotation) and a second position (corresponding to a high speed of rotation). Preferably, the activating position of the control device is the position wherein the processing unit increases the rotation speed limit, i.e. responsive to the selection of the second position corresponding to the (relatively) high speed of rotation.

Hence, in one example, the activation parameter is representative of a control device selection among a plurality of control devices or is representative of an operative position of the control device, selected among a plurality of possible operative positions of the control device.

The controller can be configured to drive the electric motor to rotate at a first predetermined rotation speed and at a second predetermined rotation speed, respectively, the second rotation speed being higher than the first rotation speed, wherein the torque-limiting function is enabled responsive to selecting the second rotation speed.

In one example, the apparatus comprises a first pedal (or any other selector operable by the user, such as a lever or a button) and a second pedal (or any other selector operable by the user, such as a lever or a button), connected to the controller to set the first rotation speed or the second rotation speed, respectively.

In one example, the apparatus comprises a (single) pedal (or any other selector operable by the user, such as a lever or a button) operable in a first operating position and in a second operating position, wherein the controller sets the first rotation speed or the second rotation speed, responsive to an operation of the pedal in the first operating position or in the second operating position, respectively.

In an embodiment, the processing unit is programmed to enable the torque-limiting function in response to the occurrence of an activation condition reached by the activation parameter.

In an embodiment, the activation condition is met when the activation parameter reaches or exceeds a threshold value representing an activation speed ($\omega_s$).

This prevents the apparatus from reaching very high working torques at equally high rotation speeds, while maintaining the possibility of reaching high working torques at controlled speeds.

In an embodiment, the processing unit is programmed to derive an activation parameter as a function of a supply voltage frequency. In other words, in this embodiment, the processing unit has access to the supply voltage frequency and controls it through the drive signal. The processing unit is configured to derive the rotation speed as a function of the supply voltage frequency (and thus as a function of the supply current, too). The processing unit is therefore configured to derive the activation parameter as a function of the supply voltage frequency, which represents the rotation speed of the motor. This allows the processing unit to switch without receiving external signals for deriving the activation parameter.

In an embodiment, the processing unit is configured to receive an enable signal. The processing unit is configured to derive the activation parameter as a function of the enable signal. The term "enable signal" is used to denote a signal representing any physical quantity which is variable over time and as a function of which the activation parameter is derived. Alternatively, or with a view to redundancy, the enable signal might be a binary signal, representing manual activation or deactivation of a pushbutton by the user.

In other embodiments, the apparatus comprises a speed sensor, configured to detect a speed signal, representing the rotation speed of the electric motor.

In an embodiment, the processing unit is configured to derive the activation parameter as a function of the speed signal. In such a case, the enable signal includes the speed signal.

In an embodiment, the processing unit is programmed to derive the control parameter as a function of the intensity of the supply current of the motor.

In other embodiments, the apparatus comprises a torque sensor, that is to say, a sensor configured to detect a quantity representing a torque imparted to the chuck or a mechanical strain transmitted to the chuck (for example, the sensor might include a load cell associated with the motor casing). The torque sensor is configured to detect a working torque imparted to the chuck by the electric motor. The torque sensor is configured to generate a control signal (torque signal) representing the working torque (that is, a working force) imparted to the chuck by the electric motor. In an example embodiment, the apparatus might also comprise, in addition or alternatively to the torque sensor, one or more sensors for detecting mechanical strain operatively transmitted to the tyre bead during mounting or demounting operations. For example, the one or more sensors are coupled to the arm to which the (mounting, demounting or bead breaker) tool is mounted; for example, the one or more sensors are extensometers (coupled to the outside wall of the aforementioned arm). In addition, or alternatively, the one or more sensors are coupled to a tool for aiding mounting (or demounting) to detect the mechanical strain transmitted by the tool to the tyre bead while the tyre is being mounted on the wheel rim. The tool is a tool configured to be stably (but removably) connected to the edge of the rim.

In an embodiment, the processing unit is programmed to derive the control parameter as a function of the control signal (torque signal).

In an embodiment, the apparatus comprises a control device. The control device can be operated by a user to send control signals to the controller. In an embodiment, the controller is configured to generate the drive signals in response to the control signals.

This disclosure refers to "working curve" to indicate a graph that associates the value of the working torque with the rotation speed for a given electric motor. Working curves may vary as a function of the set power supply parameters.

In an embodiment, the control device comprises one or more control elements (pedals, levers) which can be operated by a user to send control signals to the controller. The one or more control elements are configured to drive the electric motor according to a first working curve, defining a first maximum rotation speed, or a second working curve, defining a second maximum rotation speed. In an embodiment, the activation speed is included between the second maximum rotation speed and the first maximum rotation speed.

In an embodiment, the processing unit is programmed to switch to the disabled configuration when a disable condition is reached. In an embodiment, the disable condition depends on the rotation speed of the electric motor.

In an embodiment, the disable condition includes resetting the rotation speed of the electric motor. In an embodiment, the disable condition includes varying the direction of the rotation speed of the electric motor.

Alternatively, or with a view to redundancy, the disable condition might be a binary signal, representing manual activation or deactivation of a pushbutton by the user.

That way, if the motor is stopped because the working torque it has delivered to the chuck is too high, the torque-limiting function is disabled and the user can once again reach the required working torque at a rotation speed which can avoid enabling the torque-limiting function. The user can also restart the machine at a reduced rotation speed with all the torque available.

In an embodiment, for values of working torque greater than or equal to the threshold value, the processing unit, in the activated configuration, is programmed to generate the drive signal in such a way as to instruct the power unit to keep the working torque at a value that is equal to and/or lower than the threshold value. In an embodiment, for values of working torque greater than or equal to the threshold value, the processing unit, in the activated configuration, is programmed to switch off the motor.

In an embodiment, the processing unit is programmed to apply an additional torque-limiting function in order to prevent the electric motor from delivering a working torque that is higher than an additional threshold value. The additional threshold value for the working torque is greater than the threshold value for the working torque.

According to one aspect of it, this disclosure also provides a method for mounting or demounting a wheel tyre to or from a corresponding wheel rim.

The method comprises a step of preparing a frame.

The method comprises a step of locking the wheel to a chuck connected to the frame.

The method comprises a step of rotating the chuck about an axis of rotation by means of an electric motor, which imparts a rotation speed and a working torque to the chuck.

The method comprises a step of moving a working tool towards the chuck, preferably along a direction parallel to the axis of rotation, to interact with a tyre bead in order to mount or demount the tyre to or from the rim.

The method comprises a step of feeding the electric motor. The step of feeding is performed by a controller. The controller receives electrical power input.

The step of feeding comprises a step of generating a drive signal through a processing unit. The step of feeding comprises a step of delivering a supply voltage and a supply current to control the electric motor. The step of delivering is performed as a function of the drive signal.

The step of feeding comprises a step of deriving a control parameter. The control parameter represents the working torque delivered to the electric motor.

In an embodiment, the method comprises a step of limiting torque. In the step of limiting torque, the processing unit prevents the electric motor from delivering a working torque that is higher than a threshold value. The step of limiting torque is performed as a function of the control parameter.

In an embodiment, the method comprises a step of deriving an activation parameter. In an embodiment, the method comprises a step of switching the processing unit. In the step of switching, the processing unit switches between an activated configuration, in which the step of limiting torque is enabled, and a deactivated configuration in which the step of limiting torque is disabled. In an embodiment, the step of switching is performed as a function of the activation parameter.

In an embodiment, in the step of deriving the activation parameter, the processing unit derives the activation parameter as a function of the rotation speed of the electric motor.

In an embodiment, the processing unit switches to the activated configuration when the activation parameter meets an activation condition. In an embodiment, the processing unit switches to the activated configuration when the activation parameter is greater than or equal to a threshold value representing an activation speed.

In an embodiment, the method comprises a step of accessing supply parameters. In this step of the method, the processing unit reads (i.e., accesses) the supply voltage frequency and/or the supply voltage (or the intensity of the supply current). In this embodiment, the processing unit derives the activation parameter as a function of the supply parameters. In an embodiment, the processing unit derives the activation parameter as a function of a supply voltage frequency.

In an embodiment, the method comprises a step of receiving an enable signal in the processing unit. In an embodiment, the processing unit derives the activation parameter (i.e., generates the drive signals) as a function of the enable signal.

In an embodiment, the method comprises a step of detecting the rotation speed. In the step of detecting the rotation speed, a speed sensor generates a speed signal, representing the rotation speed of the electric motor.

In an embodiment, the processing unit derives the activation parameter as a function of the speed signal. In such a case, the speed signal defines (is, or includes) the enable signal.

In an embodiment, in the step of switching, the processing unit switches to the activated configuration when a specific control device is selected among a plurality of control device.

For example, the method comprises a step of selecting a first control device and a step of actuating a second control device, wherein each of said first and second control device is programmed to activate the apparatus with specific operating condition as for example the rotational speed of the electric motor.

The step of switching depends on which step of selecting is performed, in other words on which control device is activated. If the first control device is actuated, the processing unit switches to the activated configuration. Instead, if the second control device is actuated, the processing unit is switched to the deactivated configuration.

For example, the first control device is a first pedal, configured to control the electric motor until a first rotation speed while the second control device is a second pedal, configured to control the electric motor until a second rotation speed, lower than the first rotation speed. If the first pedal is selected, the processing unit switches to the activated configuration, to avoid over-torque with high speed. Instead, if the second pedal is selected, the lower speed allows the operator to avoid manually the over torque, hence the processing unit remains or switches in the deactivated configuration.

In an embodiment, in the step of switching, the processing unit switches to the activated configuration when the control device reaches an activating position.

The method comprises a step of controlling. In the step of controlling, a control device is operated by a user to send control signals to the controller. In an embodiment, in the step of generating the drive signals, the processing unit generates the drive signals as a function of the control signals.

In the step of switching, the processing unit switches to the deactivated configuration when a disable condition is met. In an embodiment, the disable condition is a condition set on the rotation speed of the electric motor. In an embodiment, the processing unit switches to the deactivated configuration when the rotation speed of the electric motor is zero. In an example embodiment, the processing unit switches to the deactivated configuration when the chuck reverses a rotation direction. In an example embodiment, the processing unit switches to the deactivated configuration in response to the operation of a deactivation control—for example, a pushbutton or a lever configured to deactivate the torque-limiting function.

In an embodiment, in the step of limiting torque, the processing unit generates the drive signals in such a way as to instruct the power unit to keep the working torque at a value that is equal to or lower than the threshold value. In an embodiment, in the step of limiting torque, the processing unit generates the drive signals to inhibit feeding the power unit and to switch off the electric motor.

In an embodiment, the method comprises an additional step of limiting torque. In the additional step of limiting torque, the processing unit receives the control parameter and generates the corresponding drive signal in such a way as to keep the working torque below an additional threshold value. The additional threshold value is preferably higher than the threshold value.

These and other features will become more apparent from the following detailed description of a preferred, non-limiting embodiment, illustrated by way of example in the accompanying drawings, in which:

FIG. 1 illustrates a tyre changing apparatus to mount and demount a tyre relative to a corresponding wheel rim according to this disclosure;

FIG. 2 schematically illustrates (at least part of) the tyre changing apparatus of FIG. 1:

FIGS. 3A and 3B illustrate, respectively, a first and a second example of a characteristic curve of an electric motor of the apparatus of FIG. 1;

FIGS. 3C, 3D and 3E illustrate characteristic curves of an electric motor of the apparatus of FIG. 1, according to a further example;

Figure 1:
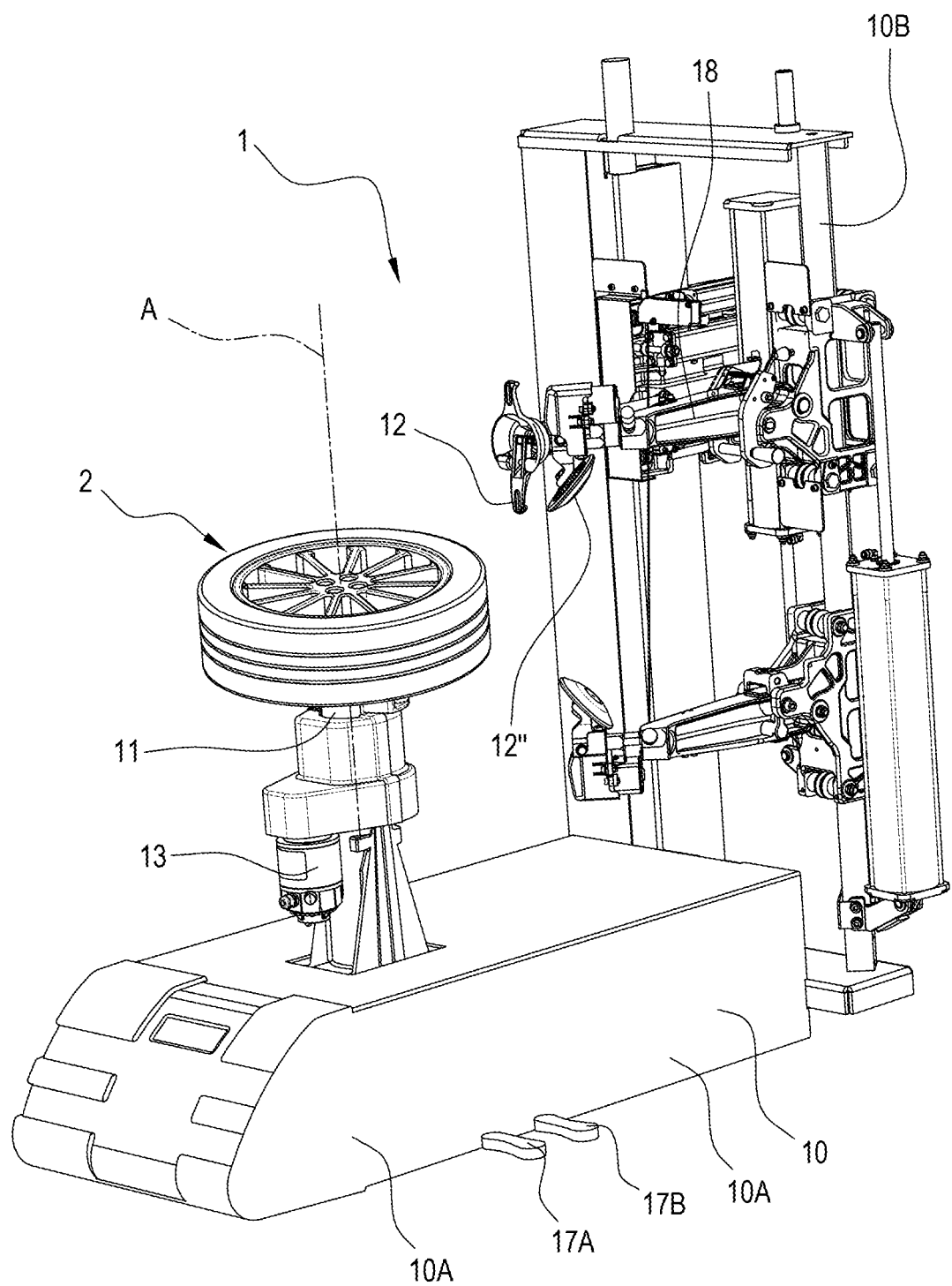
Figure 2:
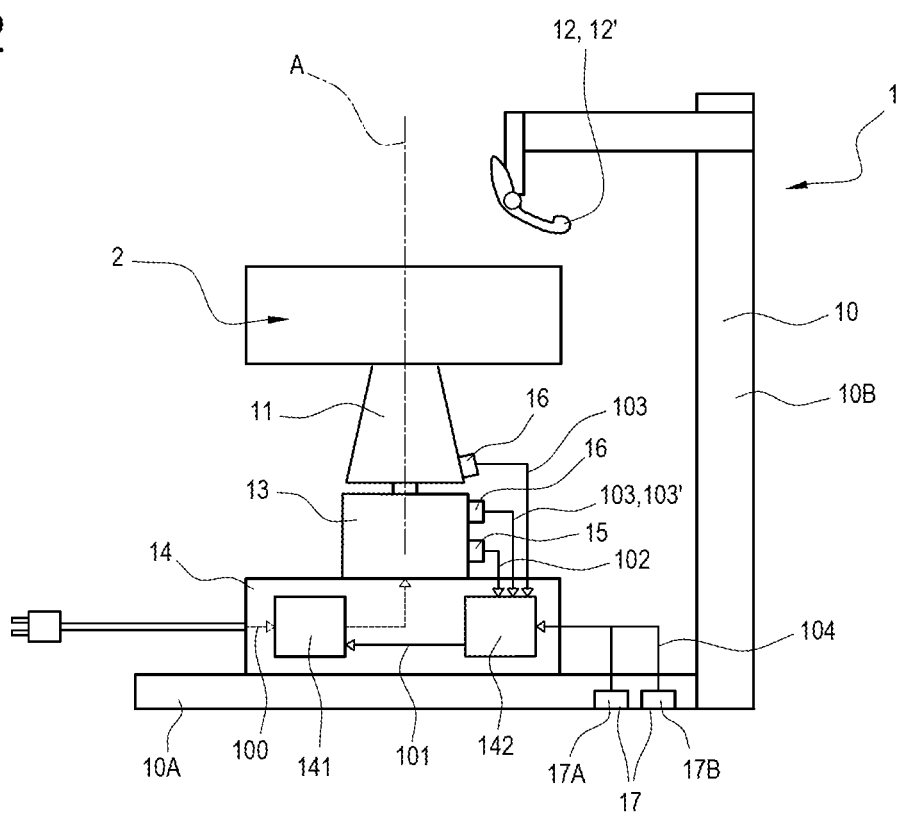
Figure 3E:
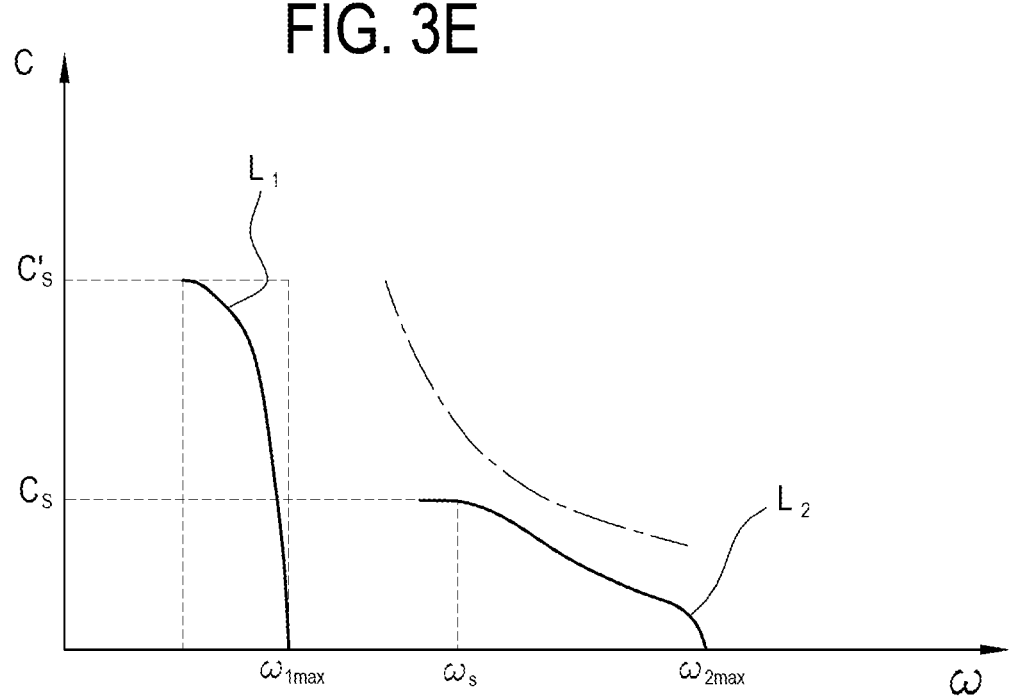
Figure 4:
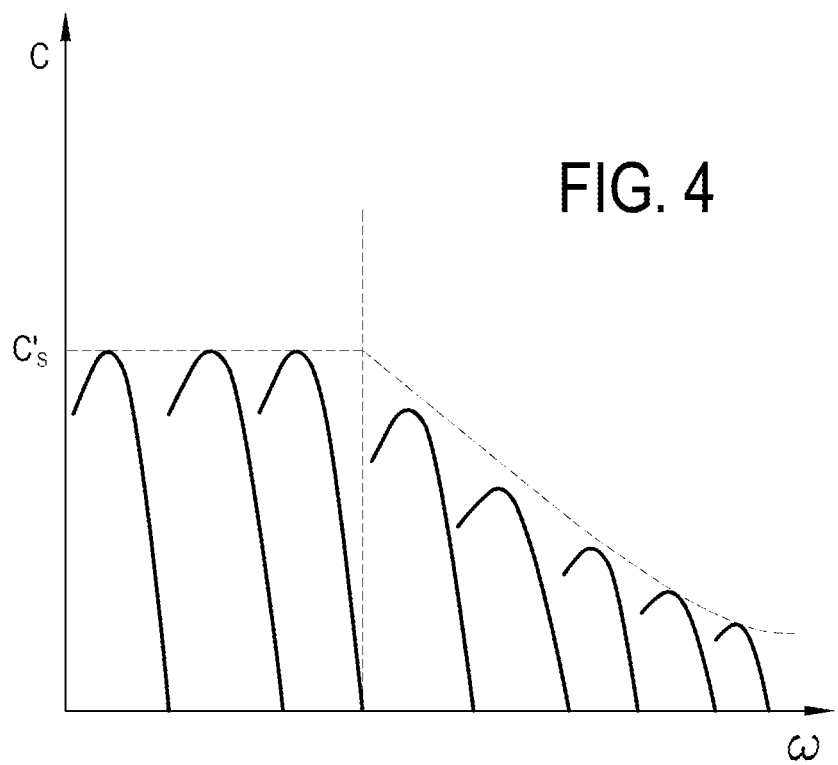
Figure 5:
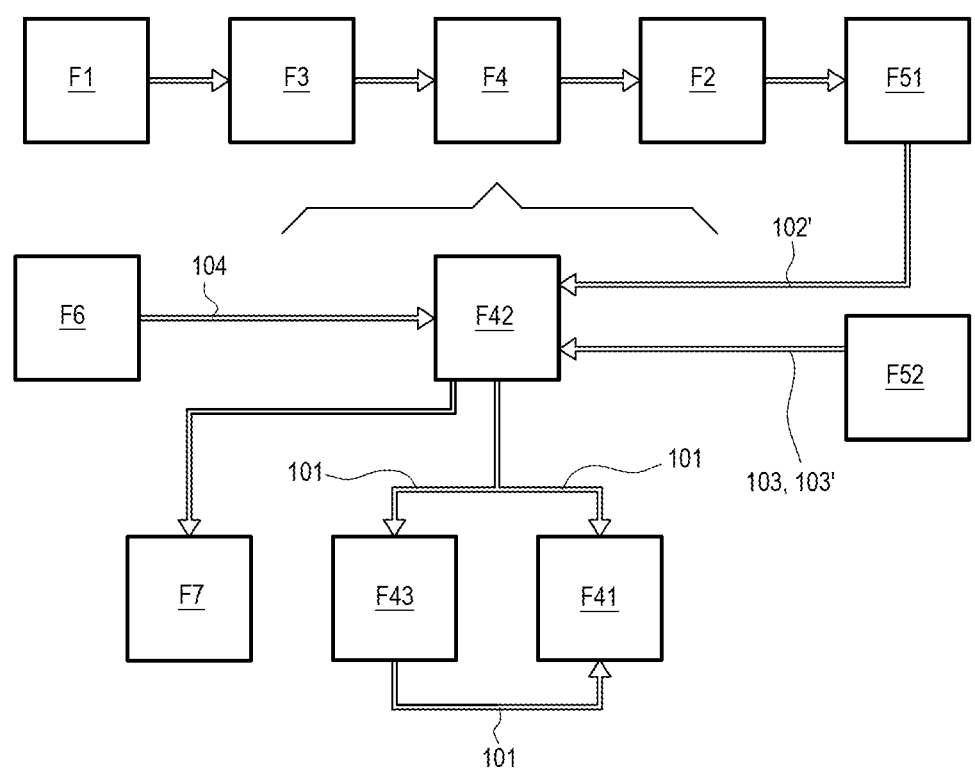

FIG. 4 schematically illustrates a plurality of characteristic curves of an electric motor for different combinations of supply voltage amplitude and frequency of the electric motor;

FIG. 5 schematically illustrates the steps of mounting and demounting a tyre relative to a corresponding wheel rim.

With reference to the accompanying drawings, the numeral 1 denotes a tyre changing apparatus for mounting and demounting a tyre relative to a corresponding rim of a wheel 2. The apparatus 1 comprises a frame 10, which supports the apparatus 1 in a workroom. In an embodiment, the frame 10 comprises a first supporting member (a first structure) 10A and a second supporting member (a second structure) 10B.

It should be noted that the embodiment illustrated represents an apparatus for mounting and demounting a tyre relative to a corresponding rim of a wheel 2 of a motorcar but without any intention of thereby excluding application of this disclosure to apparatuses for mounting and demounting a tyre relative to a corresponding rim of a wheel 2 of a heavy vehicle, such as a truck or a semitrailer.

The first supporting member 10A rests on the floor, whilst the second supporting member 10B, which may be, for example, a supporting column, is mounted to the first supporting member 10A along a direction which may be parallel or perpendicular to the weight force.

The apparatus 1 comprises a chuck 11. The chuck 11 is connected to the first supporting member 10A. The chuck 11 is configured to rotate about an axis of rotation A relative to the first supporting member 10A. The axis of rotation A is preferably parallel to the direction of the weight force but may, in some configurations of the apparatus 1, be perpendicular to the direction of the weight force.

In an embodiment, the chuck 11 is movable on the first supporting member 10A along a direction of adjustment, perpendicular to the axis of rotation A.

In an embodiment, the chuck 11 is connectable to the wheel 2 to entrain it in rotation about the axis of rotation A. The chuck 11 comprises a locking element, configured to engage the rim of the wheel 2 to lock it in rotation to the chuck 11.

In an embodiment, the apparatus 1 comprises a tool 12.

The tool 12 is configured to come into contact with the tyre of the wheel 2 to allow the apparatus to be mounted or demounted to or from the respective rim of the wheel 2. For this purpose, the tool 12 is movable towards and/or away from the wheel 2 (from the rim of the wheel 2), preferably along a direction parallel to the axis of rotation A.

The tool 12 may be, for example, a demounting tool (preferably having the shape of a claw) 12', configured to engage a tyre bead or a bead breaker 12", configured to come into contact with the tyre sidewall.

In an embodiment, the apparatus 1 comprises an operating arm 18, connected to the tool 12 and to the second supporting member 10B to support the tool 12 during mounting and demounting operations.

In an embodiment, the operating arm 18 is movable on the second supporting member 10B along a direction parallel to the axis of rotation A to move the tool 12 towards and/or away from the wheel 2.

In an embodiment, the apparatus 1 comprises an electric motor 13. The electric motor 13 preferably runs on alternating current power but, in some embodiments, a direct current power supply is also possible. The electric motor 13 is connected to the chuck 11 to impart a rotation speed and a working torque to it. In an embodiment, the electric motor 13 comprises a gear motor configured to vary (adapt) the rotation speed and working torque.

The electric motor may be disposed (contained) inside the first supporting member 10A or it may be outside of it. In some embodiments, the apparatus 1 comprises a transmission system (for example, a belt and/or a gear train), configured to transmit rotation and torque from the electric motor 13 to the chuck 11.

In an embodiment, the electric motor comprises a controller 14. In an embodiment, the controller 14 is an inverter, configured to control the electric motor 13 by varying the power supply parameters.

The power supply parameters (of the motor) include one or more of the following parameters:
- supply voltage;
- supply voltage frequency;
- intensity of a supply current.

In an embodiment, the controller 14 comprises a power unit 141. In an embodiment, the controller 14 comprises a processing unit 142. The power unit is configured to receive electric power 100 from an external power supply: for example, mains or battery.

The power unit 141 is configured to condition the electric power 100 received and to deliver electric power having a supply voltage and a supply frequency. The power unit 141 is configured to deliver electric power having a supply voltage and a supply current as a function of a drive signal 101.

In other words, in an embodiment, the power unit 141 controls electrical power components (for example, power transistors or switches) as a function of the drive signal 101 in such a way as to condition the electric power 100 and to deliver the required supply voltage and supply frequency to the electric motor 13.

With reference to FIG. 4, note, for example, how a characteristic curve of the motor varies with the variation of the supply voltage (amplitude) and the supply voltage frequency (the curve shows the different types of control that can be implemented). The graph can be divided into two zones:
- a first zone, corresponding to a rotation speed that is higher than a preset rotation speed, where the frequency increases with the resistant load, while the amplitude of the supply voltage remains constant;
- a second zone, corresponding to a rotation speed that is lower than the preset rotation speed, where the working torque is maintained at the maximum deliverable value, keeping a constant ratio between the supply voltage amplitude and the supply frequency.

In an embodiment, the processing unit 142 is configured to generate the drive signal 101.

The processing unit 142 is configured to derive a control parameter 102. The control parameter 102 is a parameter by which the processing unit 142 performs feedback control to set the power supply parameters of the electric motor 13. In an embodiment, the control parameter 102 represents the working torque. In an embodiment, the control parameter 102 represents the resistance torque. In an embodiment, the control parameter 102 represents the rotation speed or any quantity to be controlled by feedback.

In an embodiment, the apparatus 1 comprises a control device 17. The control device 17 is configured to send control signals 104, entered by a user, to the processing unit 142.

In an embodiment, the control signal 104 represents a rotation speed of the electric motor 13.

The processing unit is configured to generate the drive signal 101 as a function of the control parameter 102 and/or as a function of the control signal 104.

In an embodiment, the control device 17 comprises a first control element. The first control element may be a first pedal 17A, for example. In an embodiment, the control device 17 comprises a second control element. The second control element may be a second pedal 17B, for example. According to an aspect of this disclosure, the first pedal 17A is configured to be operated by a user to send a first set of control signals to the processing unit 142. The processing unit 142 is configured to generate the drive signal 101 as a function of the first set of control signals, to control the motor according to a first working curve L1, having a first maximum rotation speed $\omega_{1max}$. The second pedal 17B is configured to be operated by a user to send a second set of control signals to the processing unit 142. The processing unit 142 is configured to generate the drive signal 101 as a function of the second set of control signals, to control the motor according to a second working curve L2, having a second maximum rotation speed $\omega_{2max}$. In an embodiment, the second rotation speed $\omega_{2max}$ is higher than the first maximum rotation speed $\omega_{1max}$.

In other embodiments, the control device 17 may also comprise a single control element: for example, a single pedal. In these embodiments, the single pedal includes a plurality of operating positions. Depending on the operating position of the single pedal, the control device is configured to send to the processing unit 142 respective control signals, as a function of which the processing unit 142 generates the drive signal. The electric motor 13 is therefore operated according to the first working curve L1 at a first operating position of the single pedal and according to the second working curve L2 at a second operating position of the single pedal.

In an embodiment, the control device 17 is configured to adjust a rotation direction of the chuck. More specifically, in an embodiment, the control device 17 is configured to instruct the chuck to rotate in a first rotation direction. For example, but with no limitation of scope implied, the chuck rotates in the first rotation direction when the pedal is raised. In an embodiment, the control device 17 is configured to instruct the chuck to rotate in a second rotation direction. For example, but with no limitation of scope implied, the chuck rotates in the first rotation direction when the pedal is pressed down.

In an embodiment, the processing unit 142 is configured to run a transient by which the rotation speed changes from the first maximum rotation speed $\omega_{1max}$ to the second maximum rotation speed $\omega_{2max}$. More specifically, during the transient, the processing unit 142 is configured to operate the chuck at the first maximum rotation speed $\omega_{1max}$ for a predetermined length of time and to then automatically bring the speed up to the second maximum rotation speed $\omega_{2max}$.

In an embodiment, the processing unit 142 is programmed to apply a torque limiting function. In other words, the processing unit 142 is programmed to generate the drive signal 101 in such a way as to prevent the working torque from exceeding a threshold value $C_s$. The processing unit 142 is programmed to apply the torque-limiting function as a function of the control parameter 102. In short, the processing unit 142 is programmed to check that the control parameter remains below a value corresponding to the threshold value $C_s$ of the working torque. For example, the processing unit 142 is configured to compare the value of the intensity of the supply current (which may be measured on a shunt resistor in series with the electric motor) with the current value corresponding to the threshold value $C_s$, which corresponds to the working torque not to be exceeded. In other embodiments, the apparatus comprises a torque sensor 15. The torque sensor 15 is configured to detect a working torque of the chuck. In an embodiment, the torque sensor 15 is configured to detect a working torque directly at the electric motor, thus avoiding measurements affected by the efficiency of the gear motor. The torque sensor 15 is configured to send to the processing unit 142, a control signal 102', as a function of which the processing unit determines the control parameter 102.

In an embodiment, the processing unit 142 can be switched between an activated configuration, in which the torque-limiting function is enabled, and a deactivated configuration in which the torque-limiting function is disabled. In other words, the processing unit 142 is programmed to apply a conditional torque limiting function, that is to say, a torque limiting function that is enabled only if an activation condition is met.

In an embodiment, the processing unit 142 is configured to derive an activation parameter. In an embodiment, the processing unit 142 is programmed to switch as a function of the control parameter 102. In an embodiment, the processing unit 142 is in the activated configuration when the activation parameter meets the activation condition.

In an embodiment, the activation parameter represents the rotation speed of the electric motor 13. In an embodiment, the processing unit 142 is programmed to derive the activation parameter as a function of the rotation speed of the electric motor 13. In an embodiment, the processing unit 142 is programmed to derive the activation parameter as a function of the supply voltage frequency of the electric motor 13.

In short, in the preferred embodiment, the processing unit 142 is programmed to access the value of the supply voltage frequency, as a function of which it is programmed to derive the activation parameter—for example, the corresponding rotation speed of the electric motor 13. Lastly, the processing unit 142 is programmed to process the rotation speed of the electric motor 13 to check that it meets the activation condition.

In an embodiment, the activation condition is met when the activation parameter reaches or exceeds a threshold value. In an embodiment, the activation condition is met when the rotation speed of the electric motor 13 reaches or exceeds an activation speed $\omega_s$.

In an embodiment, the processing unit 142 is programmed to derive the activation parameter by processing an enable signal (that is, a signal used by the processing unit to derive the activation parameter) received from a sensor of the apparatus 1.

To obtain the enable signal, the apparatus 1 comprises a speed sensor, configured to detect a signal representing the rotation speed of the chuck.

In an example embodiment, the apparatus 1 comprises a (first) speed sensor 16, configured to detect the rotation speed of the electric motor 13 (upstream of the gear motor) and to generate a corresponding speed signal 103. The speed sensor 16 is configured to send the speed signal 103 to the processing unit 142. In an embodiment, the speed sensor 16 may be an encoder.

In an example embodiment, the apparatus 1 comprises a (second) speed sensor 16', configured to detect the rotation speed of the chuck (for example, an encoder associated with the chuck 11) and to generate a corresponding (second) speed signal 103'.

The processing unit 142 is programmed to derive the activation parameter as a function of the speed signal 103 and/or 103' received from the speed sensor 16 and/or 16'.

In an embodiment, the processing unit 142 is programmed to switch to the disabled configuration when a disable condition is reached by the apparatus 1. In an embodiment, the processing unit 142 is programmed to switch to the disabled configuration when a disable condition is reached by the activation parameter. In an embodiment, the processing unit 142 is programmed to switch to the disabled configuration when a disable condition is reached by the rotation speed of the electric motor 13. In an embodiment, the disable condition is met when the electric motor 13 switches off (rotation speed of the chuck 11 is zero) or when the rotation direction of the motor 13 is reversed. In other embodiments, the disable condition can be obtained by operating or not operating a dedicated control with which the user can switch the processing unit 142 between the activated configuration and the deactivated configuration.

It should be noted that in some embodiments, the apparatus 1 comprises a resetting element. The resetting element is programmed to send a reset signal to the processing unit 142. In some embodiments, the processing unit 142 is programmed not to switch to the activated configuration until after receiving the reset signal. This embodiment is just an example of how a resetting procedure can be implemented. In effect, in other embodiments, the disable condition also causes automatic resetting of the apparatus 1 which is thus made ready to switch to the activated configuration once again. In an embodiment, the apparatus is equipped with a signalling device for indicating to the user the activated/deactivated configuration state. In an embodiment, the signalling device is an optical device, such as a flashing light, for example; in another embodiment, the signalling device is an acoustic device.

In an example embodiment, the processing unit 142 is configured to apply an additional torque limiting function. In other words, the processing unit 142 is programmed to generate the drive signal 101 in such a way as to prevent the working torque from exceeding an additional threshold value $C_s'$. In an embodiment, the additional threshold value $C_s'$ is the value of the maximum torque deliverable by the electric motor 13. The processing unit 142 is programmed to apply the additional torque-limiting function as a function of the control parameter 102. In short, the processing unit 142 is programmed to check that the control parameter 102 remains below a value corresponding to the additional threshold value $C_s'$ of the working torque. In an embodiment, the additional threshold value $C_s'$ is greater than the threshold value $C_s$.

According to one aspect of it, this disclosure provides a method for mounting or demounting a tyre to or from the respective rim of a wheel 2.

The method comprises a step of preparing a frame 10.

The method comprises a step F1 of locking the wheel 2 to a chuck 11 of the frame 10. The method comprises a step F2 of rotating the chuck 11 about an axis of rotation A by means of an electric motor 13. In the step of rotating, the electric motor 13 imparts a rotation speed and a working torque to the chuck 11.

The method comprises a step F3 of moving a (working) tool 12 towards and/or away from the chuck 11, preferably along a direction parallel to the axis of rotation of the chuck 11. The tool 12 moves towards the tyre to interact with it, in particular to engage the tyre bead or to press against the sidewall of the tyre to break the bead. The tool can come into contact with the tyre when the electric motor 13 is stationary as well as when it is set in rotation.

The method comprises a step F4 of feeding the electric motor 13. In the step of feeding the electric motor, a controller 14 delivers a supply voltage and a certain supply frequency to the electric motor 13. The controller 14 receives electric power 100 from the mains from an external power source.

The step F4 of feeding comprises a step F42 of generating a drive signal 101 through a processing unit 142 of the controller 14. The drive signal 101 is sent to a power unit 141 of the controller 14, which conditions the electric power 100 as a function of the drive signal 101 in order to obtain the required supply voltage and current.

In an embodiment, the step F4 of feeding comprises a step F41 of delivering the supply voltage and supply voltage frequency of the electric motor 13 as a function of the drive signal 101.

In an embodiment, the step F4 of feeding comprises a step of deriving a control parameter 102. Through the control parameter 102, the processing unit 142 performs a feedback control to generate the drive signal 101 and to set power supply parameters (supply voltage frequency, supply voltage and electric current) of the electric motor 13. In an embodiment of the method, the control parameter 102 represents the working torque and/or the rotation speed or any quantity to be controlled by feedback.

In an embodiment, the method comprises a step F6. of controlling. In the step F6 of controlling, a control device 17 sends a control signal 104, entered by a user, to the processing unit 142. Preferably, the control signal 104 represents a rotation speed of the electric motor 13.

In the step of generating the drive signal 101, the processing unit generates the drive signal 101 as a function of the control parameter 102 and/or as a function of the control signals 104.

In an embodiment, in the step F6 of controlling, a first control element 17A of the control device 17 is operated by a user and sends a first set of control signals to the processing unit 142. In an embodiment, in the step F6 of controlling, a second control element 17B of the control device 17 is operated by a user and sends a second set of control signals to the processing unit 142. In an example embodiment, the processing unit 142 generates the drive signal 101 as a function of the first set of control signals, to control the electric motor 13 according to a first working curve L1, having a first maximum rotation speed $\omega_{1max}$.

In an embodiment, the processing unit 142 generates the drive signal 101 as a function of the second set of control signals, to control the electric motor 13 according to a second working curve L2, having a second maximum rotation speed $\omega_{2max}$. In an embodiment, the second rotation speed $\omega_{2max}$ is higher than the first maximum rotation speed $\omega_{1max}$.

In an embodiment, in the step F6 of controlling, a single pedal of the control device 17 is moved between a plurality of operating positions. For each operating position, the single pedal sends a respective set of control signals, corresponding to respective working curves of the electric motor. The electric motor 13 is therefore operated according to the first working curve L1 at a first operating position of the single pedal and according to the second working curve L2 at a second operating position of the single pedal.

In an example embodiment, the single pedal has a third operating position, at which the electric motor 13 is driven in the direction opposite to that of the first working curve L1.

In an embodiment, the method comprises a step F43 of limiting torque. The processing unit 142 generates the drive signal 101 in such a way as to prevent the working torque from exceeding a threshold value $C_s$. The processing unit 142 limits the working torque as a function of the control parameter 102. In the step of limiting torque, the processing unit 142 checks that the control parameter remains below a value corresponding to the threshold value $C_s$ of the working torque. For example, the processing unit 142 compares the value of the intensity of the current (which may be derived in real time from the drive signal) with the threshold value $C_s$, which corresponds to the working torque not to be exceeded.

In other embodiments, the method comprises a step F51 of detecting a control signal, where a torque sensor 15 detects a control signal 102' representing the working torque of the chuck 11. The torque sensor 15 sends to the processing unit 142, a control signal 102' used by the processing unit to determine the control parameter 102 (and thus to generate the drive signal 101).

In an embodiment, the method comprises a step F7 of switching. In the step F7 of switching, the processing unit 142 switches between an activated configuration, in which the step of limiting torque is enabled, and a deactivated configuration in which the step of limiting torque is disabled. In other words, the processing unit 142 applies the torque limiting function in a conditional manner, that is to say, the torque limiting function is enabled only if an activation condition is met.

In an embodiment, therefore, the apparatus is operated in a deactivated configuration and, after checking that an enable condition is met, switches to an activated configuration. For example, the apparatus starts with the chuck stationary and the torque limiting function initially disabled and then enabled when the threshold speed is exceeded.

In an embodiment, the method comprises a step of deriving an activation parameter. In an embodiment, the processing unit 142 performs the step of switching as a function of the control parameter. In an embodiment, the processing unit 142 is in the activated configuration when the activation parameter meets the activation condition. In an embodiment, the processing unit 142 derives the activation parameter as a function of the rotation speed of the electric motor 13, preferably as a function of the supply voltage frequency of the electric motor.

In short, in the preferred embodiment, the processing unit 142 accesses the value of the supply voltage frequency of the motor and derives the activation parameter—for example, the corresponding rotation speed of the electric motor 13. Lastly, the processing unit 142 processes the rotation speed of the electric motor 13 to check that it meets the activation condition.

In an embodiment, the activation condition is met when the activation parameter reaches or exceeds a threshold value. More specifically, in an embodiment, the activation condition is met when the rotation speed of the electric motor 13 reaches or exceeds an activation speed $\omega_s$.

In an embodiment, the processing unit 142 derives the activation parameter by processing an enable signal received from a sensor of the apparatus 1.

In an embodiment, the method comprises a step F52 of detecting an enable signal, preferably a speed signal. In the step F52 of detecting, a (first) speed sensor 16 detects the rotation speed of the drive shaft of the electric motor 13 and generates a corresponding (first) speed signal 103. In the step F52 of detecting, a (second) speed sensor 16' detects the rotation speed of the chuck 11 and generates a corresponding (second) speed signal 103'. In an embodiment, the processing unit 142 derives the activation parameter as a function of the speed signal 103' received from the speed sensor 16.

In an embodiment, the method (the step of switching) comprises a step of deactivating (disabling), in which the processing unit 142 switches to the deactivated configuration when the apparatus meets a disable condition, preferably when the activation parameter meets the disable condition. In an embodiment, the processing unit 142 switches to the deactivated configuration when a disable condition is reached by the rotation speed of the electric motor 13. In an embodiment. the disable condition is met (occurs) when the electric motor 13 switches off (rotation speed of the electric motor 13 is zero) or when the rotation direction of the motor (that is, of the chuck 11) is reversed. In other embodiments of the method, the step of disabling can be carried out by the user through a dedicated control with which the user can switch the processing unit 142 between the activated configuration and the deactivated configuration.

In an embodiment, the method comprises a step of resetting, in which a resetting element sends a resetting signal to the processing unit 142. In some embodiments, the processing unit 142 does not switch to the activated configuration until after receiving the reset signal. In other words, the apparatus 1 is operated with the processing unit 142 in the deactivated configuration. Next, after reaching the activated condition, the processing unit 142 changes over to the activated configuration. When the motor switches off—for example, because the value of the working torque exceeds the threshold value $C_s$—the processing unit 142 switches back to the deactivated configuration. At this point, when the apparatus 1 is next operated, the processing unit 142 will be programmed to switch to the activated configuration only after it receives the resetting signal. This embodiment is just an example of how a resetting procedure can be implemented. In effect, in other embodiments, the disable condition also causes automatic resetting of the apparatus 1.

In an embodiment, the method comprises an additional step of limiting torque, in which the processing unit 142 generates the drive signal 101 in such a way as to prevent the working torque from exceeding an additional threshold value $C_s'$. The processing unit 142 applies the additional torque-limiting function as a function of the control parameter 102. In short, the processing unit 142 checks that the control parameter remains below a value corresponding to the additional threshold value $C_s'$ of the working torque.

The invention claimed is:

1. A tyre changing apparatus for demounting and mounting a tyre relative to a respective rim of a vehicle wheel comprising:
    a frame;
    a chuck, connected to the frame to rotate about an axis of rotation and connectable to the wheel to entrain it in rotation;
    a working tool, connected to the frame and movable towards and away from the chuck to interact with a bead of the tyre;
    an electric motor, connected to the chuck to apply a rotation speed and a working torque to the chuck;
    a controller configured to control the electrical motor, the controller receiving an electrical power input including:
    a power unit, wherein the power unit is powered through the electrical power input and delivers to the electric motor a supply voltage and a supply current as a function of a drive signal;
    a processing unit wherein the processing unit generates the drive signal and is programmed to:
    i) derive a control parameter, the control parameter representing the working torque applied by the electric motor,
    ii) set a torque-limiting function as a function of the control parameter, wherein the torque-limiting function prevents the electric motor from applying a working torque that is higher than a threshold value, wherein the processing unit includes an activated configuration, wherein the torque-limiting function is enabled, and a deactivated configuration, wherein the torque-limiting function is disabled,
    iii) derive an activation parameter and,
    iv) responsive to the activation parameter, commute between the activated configuration and the deactivated configuration.

2. The apparatus according to claim 1, wherein the activation parameter is associated with the rotation speed of the electric motor.

3. The apparatus according to claim 2, wherein the processing unit is programmed to enable the torque-limiting function when the activation parameter reaches or exceeds a threshold value representing an activation speed.

4. The apparatus according to claim 2, wherein the processing unit is programmed to derive the activation parameter as a function of a supply voltage frequency of the electric motor.

5. The apparatus according to claim 2, comprising a speed sensor, configured to detect a speed signal, representing the rotation speed of the electric motor, wherein the processing unit is configured to derive the activation parameter as a function of the speed signal.

6. The apparatus according to claim 1, comprising a control device which can be operated by a user to send control signals to the controller and wherein the controller is configured to generate the drive signals in response to the control signals.

7. The apparatus according to claim 1, wherein the processing unit is programmed to switch to the disabled configuration when a disable condition is reached.

8. The apparatus according to claim 7, wherein the disable condition is met by the rotation speed of the electric motor and includes resetting the rotation speed of the electric motor or changing the rotation direction of the electric motor.

9. The apparatus according to claim 1, wherein, for values of working torque greater than or equal to the threshold value, the processing unit, in the activated configuration, is programmed to generate the drive signal in such a way as to instruct the power unit to keep the working torque at a value that is constant at the threshold value.

10. The apparatus according to claim 1, wherein the processing unit is programmed to apply an additional torque-limiting function in order to prevent the electric motor from delivering a working torque that is higher than an additional threshold value, which is greater than the threshold value for the working torque.

11. The apparatus according to claim 1, wherein the activation parameter is representative of a control device selection among a plurality of control devices or is representative of an operative position of the control device, selected among a plurality of possible operative positions of the control device.

12. The apparatus according to claim 1, wherein the controller is configured to drive the electric motor to rotate at a first predetermined rotation speed and at a second predetermined rotation speed, respectively, the second rotation speed being higher than the first rotation speed, wherein the torque-limiting function is enabled responsive to selecting the second rotation speed.

13. The apparatus according to claim 12, comprising a first pedal and a second pedal, connected to the controller to set the first rotation speed or the second rotation speed, respectively.

14. The apparatus according to claim 12, comprising a pedal operable in a first operating position and in a second operating position, wherein the controller sets the first rotation speed or the second rotation speed, responsive to an operation of the pedal in the first operating position or in the second operating position, respectively.

15. The tyre changing apparatus according to claim 1, comprising a torque sensor, the torque sensor detecting a working torque of the chuck and being set up to send to the processing unit a control signal, wherein the processing unit determines the control parameter as a function of said control signal.

\* \* \* \* \*